(12) United States Patent
Satran et al.

(10) Patent No.: US 8,788,755 B2
(45) Date of Patent: *Jul. 22, 2014

(54) MASS DATA STORAGE SYSTEM AND METHOD OF OPERATING THEREOF

(75) Inventors: Julian Satran, Omer (IL); Efraim Zeidner, Haifa (IL); Yechiel Yochai, D.N. Menashe (IL)

(73) Assignee: Infinidat Ltd., Herzliya (IL)

( * ) Notice: Subject to any disclaimer, the term of this patent is extended or adjusted under 35 U.S.C. 154(b) by 259 days.

This patent is subject to a terminal disclaimer.

(21) Appl. No.: 13/270,725

(22) Filed: Oct. 11, 2011

(65) Prior Publication Data

US 2012/0117322 A1 May 10, 2012

Related U.S. Application Data

(63) Continuation-in-part of application No. 13/174,070, filed on Jun. 30, 2011.

(60) Provisional application No. 61/391,656, filed on Oct. 10, 2010, provisional application No. 61/391,658, filed on Oct. 10, 2010, provisional application No. 61/391,657, filed on Oct. 10, 2010, provisional application No. 61/360,622, filed on Jul. 1, 2010.

(51) Int. Cl.
| | |
|---|---|
| *G06F 12/00* | (2006.01) |
| *G06F 3/06* | (2006.01) |
| *G06F 12/02* | (2006.01) |
| *G06F 12/10* | (2006.01) |

(52) U.S. Cl.
CPC ............ *G06F 3/064* (2013.01); *G06F 12/0284* (2013.01); *G06F 12/1009* (2013.01)
USPC .......................... 711/114; 711/171; 711/201

(58) Field of Classification Search
CPC G06F 3/0284; G06F 12/0284; G06F 12/1009
USPC ......................................... 711/114, 171, 209
See application file for complete search history.

(56) References Cited

U.S. PATENT DOCUMENTS

| 6,141,707 A * | 10/2000 | Halligan et al. ................ 710/36 |
| 2003/0105928 A1 | 6/2003 | Ash et al. |
| 2004/0054939 A1 | 3/2004 | Guha et al. |

(Continued)

OTHER PUBLICATIONS

Majone, G., "Distance-Based Cluster Analysis and Measurement Scales," Quality and Quantity, vol. 4, No. 1, pp. 153-164, (1970).

(Continued)

*Primary Examiner* — Reba I Elmore
(74) *Attorney, Agent, or Firm* — Oren Reches

(57) ABSTRACT

There are provided a mass storage system comprising a control layer operatively coupled to a physical storage space and operable to interface with one or more clients and to present to said clients a plurality of logical volumes. The method of operating the storage system comprises: dividing one or more logical volumes into a plurality of statistical segments with predefined size; assigning to each given statistical segment a corresponding activity level characterizing statistics of I/O activity with regard to data portions within the given statistical segment, said statistics collected over a plurality of cycles of fixed counting length; and managing one or more data storage processes in the storage system (e.g. a background defragmentation process, a background garbage collection process, a destage management process, etc.) using said activity level.

27 Claims, 10 Drawing Sheets

| Activity counter (501) | Activity timestamp (502) | T1 (503) | T2 (504) | T3 (505) | Waste level (506) | Defrag. level (507) | Defrag. frequency (508) |
|---|---|---|---|---|---|---|---|
| | | | | | | | |

(56) References Cited

U.S. PATENT DOCUMENTS

| | | |
|---|---|---|
| 2005/0132212 A1 | 6/2005 | Haswell |
| 2006/0107099 A1 | 5/2006 | Pinheiro et al. |
| 2006/0136684 A1 | 6/2006 | Le et al. |
| 2007/0168633 A1 | 7/2007 | English et al. |
| 2007/0220201 A1 | 9/2007 | Gill et al. |
| 2008/0104431 A1 | 5/2008 | Shimada |
| 2008/0168220 A1 | 7/2008 | Gill et al. |
| 2008/0168234 A1 | 7/2008 | Gill et al. |
| 2008/0244210 A1 | 10/2008 | Vingralek et al. |
| 2009/0055450 A1 | 2/2009 | Biller |
| 2009/0129193 A1 | 5/2009 | Joshi et al. |
| 2009/0249001 A1 | 10/2009 | Narayanan et al. |
| 2009/0254636 A1 | 10/2009 | Acedo et al. |
| 2010/0027147 A1 | 2/2010 | Subramanian et al. |
| 2010/0180093 A1 | 7/2010 | Huber et al. |
| 2011/0202722 A1 | 8/2011 | Satran et al. |
| 2012/0011313 A1 | 1/2012 | Kopylovitz et al. |
| 2012/0011314 A1* | 1/2012 | Yochai et al. ............ 711/113 |
| 2012/0011319 A1* | 1/2012 | Yochai et al. ............ 711/114 |
| 2012/0011326 A1* | 1/2012 | Higashijima et al. ........ 711/142 |

OTHER PUBLICATIONS

Colarelli, D. et al., "The Case for Massive Array of Idle Disks (MAID)," Dept. of Computer Science, University of Colorado, (Jan. 2002).

Gurumurthi, S. et al., "DRPM: Dynamic Speed Control for Power management in Server Class Disks," Proceedings of International Symposium on Computer Architecture, (2003).

Zhu, Q. et al., "PB-LRU: A Self-Tuning Power Aware Cache Replacement Algorithm for Conserving Disk Energy," Proceedings of 18th International Conference on Supercomputing, (Jul. 2004).

Pinheiro, E. et al., "Energy Conservation Techniques for Disk Array-Based Servers," Proceedings of 18th International Conference on Supercomputing, ICS '04, ACM, New York, NY, pp. 68-78, (Jul. 2004).

Li, D. et al., "EERAID: Energy Efficient Redundant and Inexpensive Disk Array, " Proceedings of the 11th Workshop on ACMSIGOPS European Workshop, (Leuven, Belgium, Sep. 19-22, 2004), EW 11, ACM, New York, NY, 29, (Sep. 2004).

Yao, X. et al., "RIMAC: A Novel Redundancy-Based Hierarchical Cache Architecture for Energy Efficient, High Performance Storage Systems," SIGOPS Oper. Syst. Rev. 40, 4, pp. 249-262, (Apr. 2006).

Weddle, C. et al., "PARAID: A Gear-Shifting Power-Aware Raid," Trans. Storage 3, 3, 13 (210/007).

Allalouf, M. et al., "Storage Modeling for Power Estimation," Proceedings of SYSTOR2009: The Israeli Experimental Systems Conference (Haifa, Israel), SYSTOR '09, ACM, New York, NY, 1-10 (May 2009).

* cited by examiner

| Activity counter (501) | Activity timestamp (502) | T1 (503) | T2 (504) | T3 (505) | Waste level (506) | Defrag. level (507) | Defrag. frequency (508) |
|---|---|---|---|---|---|---|---|
| | | | | | | | |

Figure 5

MASS DATA STORAGE SYSTEM AND METHOD OF OPERATING THEREOF

CROSS-REFERENCES TO RELATED APPLICATIONS

This application is a continuation-in-part of U.S. application Ser. No. 13/174,070 filed Jun. 30, 2011, and further relates to and claims priority from U.S. Provisional Patent Application No. 61/391,656 filed on Oct. 10, 2010 and U.S. Provisional Patent Application No. 61/391,658 filed on Oct. 10, 2010 incorporated herein by reference in their entirety.

FIELD OF THE INVENTION

The present invention relates generally to mass data storage systems and, particularly, to management of storage resources thereof.

BACKGROUND OF THE INVENTION

One of current trends of development in the data storage industry relates to methods and strategies for effective management of large scale and high capacity storage systems dealing with large volumes of stored data. One of the problems of managing the stored data is fragmentation of the physical storage space when considerable amounts of data objects are not stored each in respective contiguous storage space, but divided into a plurality of pieces. Accordingly, data that is sequential from the user's perspective may be randomly written in the storage space, thus causing a performance penalty when reading. Furthermore, when a data block is re-written and the old pointer to it is released, "garbage" blocks (i.e., blocks that do not contain valid data) are gradually accumulated. If not properly handled, this may soon lead to a complete depletion of free disk space available for writing new data.

Defragmentation processes attempt to reduce the fragmentation by physically reorganizing the contents of a storage device to store the pieces of each data object in a contiguous manner. Defragmentation and garbage collection processes also attempt to create larger regions of free space.

The problems of defragmentation/garbage collection in mass data storage have been recognized in the Prior Art and various systems have been developed to provide a solution as, for example:

US Patent Application No. 2010/180093 (Huber et al.) discloses various embodiments for rapid defragmentation of storage volumes in a computing environment. A plurality of source data sets is copied from the fragmented storage volume to a plurality of target data sets on an additional storage volume. The plurality of source data sets is placed on the additional storage volume as the plurality of target data sets in an un-fragmented order. A first volume serial number (VOLSER) of the fragmented storage volume is swapped with a second VOLSER of the additional storage volume. The fragmented storage volume is varied offline, and the additional storage volume is varied online. The computing environment recognizes the additional storage volume having the plurality of target data sets placed in the un-fragmented order.

US Patent Application No. 2007/168633 (English et al) discloses a method of operating a storage system including moving a block of data stored in the storage system to a new location in the storage system, such as for purposes of defragmentation. After the block has been moved to the new location, the storage system receives a request requiring access to the block. The storage system uses metadata appended to an identified block to detect that the block may have been relocated. The metadata can further be used to distinguish a block that has been relocated from a lost write.

US Patent Application No. 2009/055450 (Biller) discloses a method for determining file fragmentation and performing subsequent defragmentation, including measuring a file fragmentation factor, measuring a file extent distance factor, measuring a file fragmentation level, selecting a file stored as multiple extents on at least one disk, selecting a free space extent on the disk whose length most closely matches the length of the file, calculating a fragmentation level of the disk from a fragmentation factor and a file extent distance factor of free space extents or allocated space extents of the disk, calculating the effect that moving the file to the free space extent would have on the fragmentation level, and moving the file to the free space extent provided that doing so causes the fragmentation level to satisfy a criterion.

US Patent Application No. 2008/244210 (Vingralek et al.) discloses solutions for reducing the amount of fragmentation on a computer memory device. In an aspect, the application describes systems, methods and software for allocating storage space for variable-sized data chunks in a fashion that reduces or eliminates the need for periodic de-fragmentation of the memory device. In another aspect, the application describes solutions that provide for the dynamic re-allocation of existing data blocks on the memory device to provide contiguous available space that can be allocated for new data blocks.

SUMMARY OF THE INVENTION

In accordance with certain aspects of the presently disclosed subject matter, there is provided a method of operating a storage system comprising a control layer operable to interface with one or more clients and to present to said clients a plurality of logical volumes, said control layer comprising a cache memory and further operatively coupled to a physical storage space comprising a plurality of disk drives. The method comprises: dividing one or more logical volumes into a plurality of statistical segments with predefined size; assigning to each given statistical segment a corresponding activity level Characterizing statistics of I/O activity with regard to data portions within the given statistical segment, said statistics collected over a plurality of cycles of fixed counting length; and managing one or more data storage processes (e.g. a background defragmentation process, a background garbage collection process, a destage management process, etc.) in the storage system using said activity level.

The method can further comprise: selecting one or more statistical segments with activity levels fitting a first selection criterion related a given data storage process; and executing said given data storage process for one or more sets of data portions corresponding to the selected statistical segments, wherein said one or more sets of data portions fit a second selection criterion related a given data storage process.

The activity level of a given statistical segment can be characterized by an activity vector assigned to the given statistical segment. The activity vector can be characterized by at least one value obtained during a current cycle and by at least one value related to I/O statistics collected during at least one of the previous cycles. By way of non-limiting example, at any given point in time, the activity vector corresponding to a given statistical segment can be characterized, at least, by the current level of I/O activity associated with the given statistical segment, a granularity interval when the first I/O has been addressed to the given statistical segment in the current cycle and a granularity interval when the first I/O has been addressed to the given statistical segment in at least one previous cycle.

In accordance with further aspects of the presently disclosed subject matter, the method can further comprise: selecting one or more statistical segments with activity levels fitting a first defragmentation criterion; and providing defragmentation of one or more sets of data portions corresponding to the selected statistical segments, wherein said one or more sets of data portions fit a second defragmentation criterion. The method can further comprise: reading to the cache memory said one or more sets of data portions to yield data portions to be defragmented; consolidating data portions cached in the cache memory and corresponding to the same statistical segment into one or more consolidated write requests, wherein said data portions to be defragmented constitute at least part of data portions in the consolidated write requests; and enabling writing said one or more consolidated write requests to one or more disk drives. A consolidated write request can correspond to a stripe in a RAID group. Writing the consolidated write request can be provided in a write-out-of-place technique. The method can further comprise handling a constantly updated list of statistical segments matching said first defragmentation criterion.

Data portions constituting a given set of data portions can be all data portions within a given stripe in a RAID group, all data portions within two or more consecutive stripes in a RAID group, all data portions within two or more logically related stripes in one or more RAID groups, etc.

Optionally, the activity level of a given statistical segment can be characterized by an activity vector assigned to said given statistical segment, wherein at least one of the values characterizing the activity vector is related to additional physical data space required resulting from the defragmentation of data portions within the statistical segment.

In accordance with further aspects of the presently disclosed subject matter, the provided method of operating a storage system can further comprise: selecting one or more statistical segments with activity levels fitting a first garbage collection criterion; and providing re-arrangement of one or more sets of data portions corresponding to the selected statistical segments, wherein said re-arrangement enables releasing at least physical storage space corresponding to padded or outdated data portions within said one or more sets of data portions. The method can further comprise: reading to the cache memory said one or more sets of data portions to yield data portions to be re-arranged; consolidating data portions cached in the cache memory and corresponding to the selected statistical segments into one or more consolidated write requests, wherein said data portions to be re-arranged constitute at least part of data portions in the consolidated write requests; enabling writing said one or more consolidated write requests to one or more disk drives in write-out-of-place technique; and upon writing the consolidated write request, releasing the physical space corresponding to said one or more sets of data portions.

Data portions constituting a given set of data portions can be all data portions within a given stripe in a RAID group, all data portions within two or more consecutive stripes in a RAID group, and/or all data portions within two or more logically-related stripes in one or more RAID groups, while a given consolidated write request can correspond to a stripe in a RAID group.

In accordance with further aspects of the presently disclosed subject matter, the provided method of operating a storage system can further comprise: configuring a replacement sequence in the cache memory to comprise a destage pool operable to handle data portions to be used for further generation of one or more consolidated write requests; dividing the destage pool into a plurality of destage bins; handling data portions corresponding to segments with similar access patterns within a common destage bin, wherein two or more segments have similar access patterns if distance between respective activity levels matches a predefined criteria; consolidating data portions cached in the cache memory and corresponding to the same destage bin into one or more consolidated write requests; and enabling writing said one or more consolidated write requests to one or more disk drives. The destage pool can be located at the bottom of the replacement sequence.

In accordance with other aspects of the presently disclosed subject matter, there is provided a storage system comprising a physical storage space with a plurality of disk drives, the physical storage space operatively coupled to a control layer operable to interface with one or more clients and to present to said clients a plurality of logical volumes, wherein said control layer comprises a cache memory and is further operable: to divide one or more logical volumes into a plurality of statistical segments with predefined size; to assign to each given statistical segment a corresponding activity level characterizing statistics of I/O activity with regard to data portions within the given statistical segment, said statistics collected over a plurality of cycles of fixed counting length; and to manage one or more data storage processes in the storage system (e.g. a background defragmentation process, a background garbage collection process, a destage management process, etc.) using said activity levels.

The storage control layer can be further operable to select one or more statistical segments with activity levels fitting a first selection criterion related to a given data storage process; and to execute said given data storage process for one or more sets of data portions corresponding to the selected statistical segments, wherein said one or more sets of data portions fit a second selection criterion related a given data storage process.

In accordance with further aspects of the presently disclosed subject matter, the storage control layer can be further operable to select one or more statistical segments with activity levels fitting a first defragmentation criterion; wherein the storage control layer can further comprise a defragmentation module operatively coupled to the cache memory and operable to enable defragmentation of one or more sets of data portions corresponding to the selected statistical segments, wherein said one or more sets of data portions fit a second defragmentation criterion. The defragmentation module can be further operable to handle a constantly updated list of statistical segments matching said first defragmentation criterion.

The storage control layer can be further operable to enable reading to the cache memory said one or more sets of data portions to yield data portions to be defragmented; to consolidate data portions cached in the cache memory and corresponding to the same statistical segment into one or more consolidated write requests, wherein said data portions to be defragmented constitute at least part of data portions in the consolidated write requests; and to enable writing said one or more consolidated write requests to one or more disk drives.

In accordance with further aspects of the presently disclosed subject matter, the storage control layer can be further operable to select one or more statistical segments with activity levels fitting a first garbage collection criterion; and to provide re-arrangement of one or more sets of data portions corresponding to the selected statistical segments, wherein said re-arrangement enables releasing at least physical storage space corresponding to padded or outdated data portions within said one or more sets of data portions. The storage control layer can be further operable to read to the cache memory said one or more sets of data portions to yield data portions to be re-arranged; to consolidate data portions cached in the cache memory and corresponding to the selected statistical segments into one or more consolidated write requests, wherein said data portions to be re-arranged constitute at least part of data portions in the consolidated write requests; to enable writing said one or more consolidated write requests to one or more disk drives in write-out-of-place technique; and upon writing the consolidated write request, to release the physical space corresponding to said one or more sets of data portions.

BRIEF DESCRIPTION OF THE DRAWINGS

In order to understand the invention and to see how it can be carried out in practice, embodiments will now be described, by way of non-limiting example only, with reference to the accompanying drawings, in which:

FIG. 5 illustrates a schematic diagram of an activity vector in accordance with certain embodiments of the presently disclosed subject matter;

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "recognizing", "identifying", "selecting", "allocating", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The references cited in the background teach many principles of operating a storage system that are applicable to the presently disclosed subject matter. Therefore the full contents of these publications are incorporated by reference herein where appropriate for appropriate teachings of additional or alternative details, features and/or technical background.

The term "criterion" used in this patent specification should be expansively construed to include any compound criterion, including, for example, several criteria and/or their logical combinations.

Figure 1:
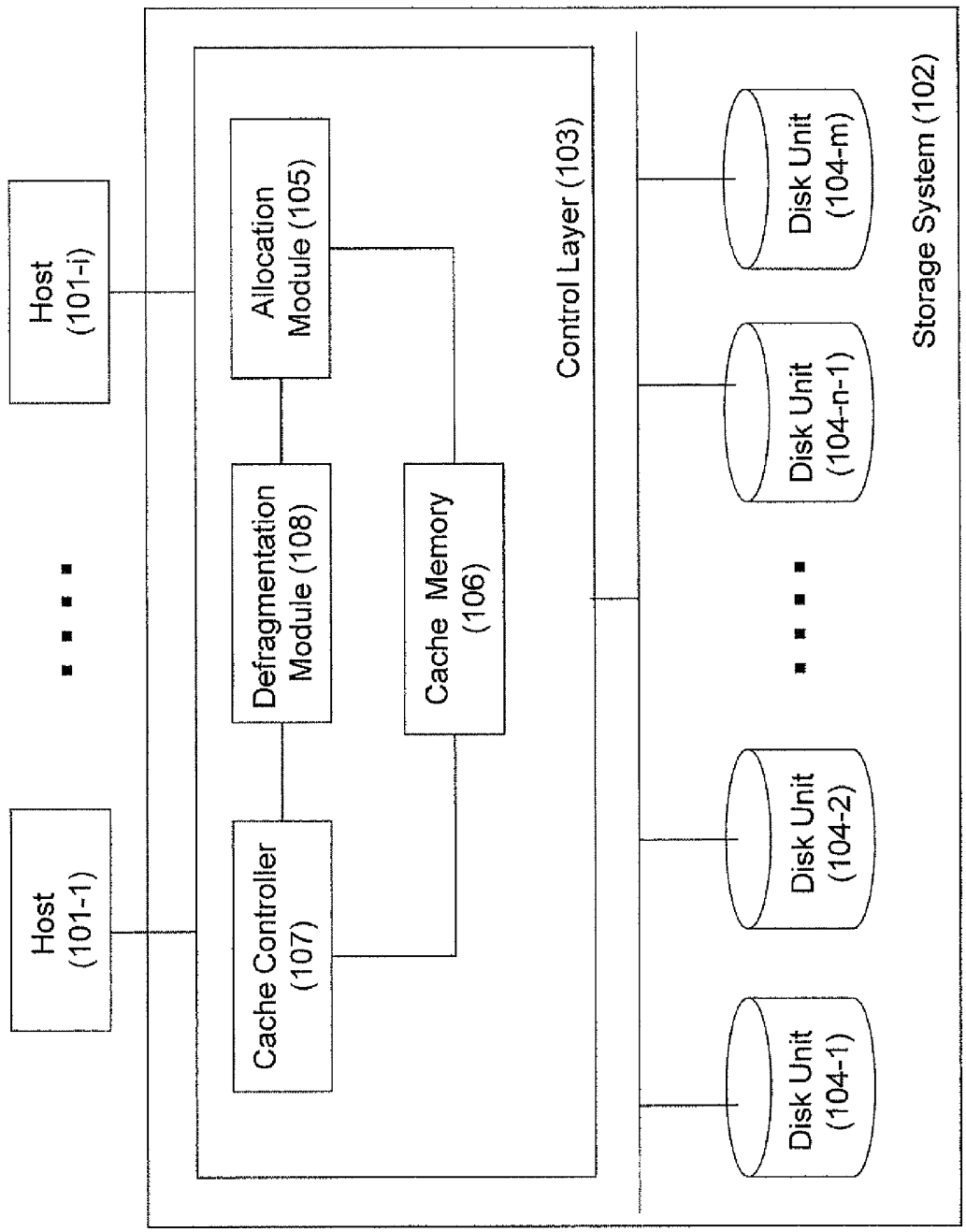
FIG. 1 illustrates a generalized functional block diagram of a mass storage system in accordance with certain embodiments of the presently disclosed subject matter.

Bearing this in mind, attention is drawn to FIG. 1 illustrating an embodiment of a storage system in accordance with presently disclosed subject matter.

The plurality of host computers (workstations, application servers, etc.) illustrated as 101-1-101-n share common storage means provided by a storage system 102. The storage system comprises a plurality of data storage devices 104-1-104-m constituting a physical storage space optionally distributed over one or more storage nodes and a storage control layer 103 comprising one or more appropriate storage control devices operatively coupled to the plurality of host computers and the plurality of storage devices, wherein the storage control layer is operable to control interface operations (including I/O operations) therebetween. The storage control layer is further operable to handle a virtual representation of physical storage space and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer can differ depending on interfacing applications.

The physical storage space can comprise any appropriate permanent storage medium and include, by way of non-limiting example, one or more disk drives and/or one or more disk units (DUs), comprising several disk drives. The storage control layer and the storage devices can communicate with the host computers and within the storage system in accordance with any appropriate storage protocol.

Stored data can be logically represented to a client (e.g. a user, an application, etc.) in terms of logical objects. Depending on storage protocol, the logical objects can be logical volumes, data files, image files, etc. For purpose of illustration only, the following description is provided with respect to logical objects represented by logical volumes. Those skilled in the art will readily appreciate that the teachings of the present invention are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation unit". Data portions are typically of equal size throughout the system (by way of non-limiting example, the size of a data portion can be 64 Kbytes).

The storage control layer can be further configured to facilitate various protection schemes. By way of non-limiting example, data storage formats, such as RAID (Redundant Array of Independent Discs), can be employed to protect data from internal component failures by making copies of data and rebuilding lost or damaged data. As the likelihood for two concurrent failures increases with the growth of disk array sizes and increasing disk densities, data protection can be implemented, by way of non-limiting example, with the RAID 6 data protection scheme well known in the art.

Common to all RAID 6 protection schemes is the use of two parity data portions per several data groups (e.g. using groups of four data portions plus two parity portions in (4+2) protection scheme), the two parities being typically calculated by two different methods. Under one known approach, all N consecutive data portions are gathered to form a RAID group, to which two parity portions are associated. The members of a group as well as their parity portions are typically stored in separate drives. Under a second known approach, protection groups can be arranged as two-dimensional arrays, typically n*n, such that data portions in a given line or column of the array are stored in separate disk drives. In addition, to every row and to every column of the array a parity data portion can be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using techniques based on XOR or Reed-Solomon algorithms). Whenever a data portion in a group becomes unavailable (e.g. because of disk drive general malfunction, or because of a local problem affecting the portion alone, or because of other reasons), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

The storage control layer can further comprise an Allocation Module 105, a Cache Memory 106 operable as part of the I/O flow in the system, and a Cache Control Module 107, that regulates data activity in the cache and controls destage operations.

The allocation module, the cache memory and/or the cache control module can be implemented as centralized modules operatively connected to the plurality of storage control devices or can be distributed over a part or all storage control devices.

Typically, definition of LUs and/or other objects in the storage system can involve in-advance configuring an allocation scheme and/or allocation function used to determine the location of the various data portions and their associated parity portions across the physical storage medium. Sometimes, as in the case of thin volumes or snapshots, the preconfigured allocation is only performed when a write command is directed for the first time after definition of the volume, at a certain block or data portion in it.

An alternative known approach is a log-structured storage based on an append-only sequence of data entries. Whenever the need arises to write new data, instead of finding a formerly allocated location for it on the disk, the storage system appends the data to the end of the log. Indexing the data can be accomplished in a similar way (e.g. metadata updates can be also appended to the log) or can be handled in a separate data structure (e.g. index table).

Storage devices, accordingly, can be configured to support write-in-place and/or write-out-of-place techniques. In a write-in-place technique modified data is written back to its original physical location on the disk, overwriting the older data. In contrast, a write-out-of-place technique writes (e.g. in log form) a modified data block to a new physical location on the disk. Thus, when data is modified after being read to memory from a location on a disk, the modified data is written to a new physical location on the disk so that the previous, unmodified version of the data is retained. A non-limiting example of the write-out-of-place technique is the known write-anywhere technique, enabling writing data blocks to any available disk without prior allocation.

When receiving a write request from a host, the storage control layer defines a physical location(s) for writing the respective data (e.g. a location designated in accordance with an allocation scheme, preconfigured rules and policies stored in the allocation module or otherwise and/or location available for a log-structured storage) and further processes the request accordingly. When receiving a read request from the host, the storage control layer defines the physical location(s) of the desired data and further processes the request accordingly. The storage control layer issues updates to a given data object to all storage nodes which physically store data related to said data object. The storage control layer can be further operable to redirect the request/update to storage device(s) with appropriate storage location(s) irrespective of the specific storage control device receiving I/O request.

The storage control layer can further comprise a defragmentation module 108 operatively coupled to the cache memory 106, allocation module 105 and cache controller 107. Operating of the defragmentation module is further detailed with reference to FIGS. 5-8.

For purpose of illustration only, the operation of the storage system is described herein in terms of entire data portions. Those skilled in the art will readily appreciate that the teachings of the present invention are applicable in a similar manner to partial data portions.

Those versed in the art will readily appreciate that the embodiments of the invention are not bound by the specific architecture described with reference to FIG. 1; equivalent and/or modified functionality can be consolidated or divided in another manner and can be implemented in any appropriate combination of software, firmware and hardware. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wireline, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.). By way of non-limiting example, the invention can be implemented in a SAS grid storage system disclosed in U.S. patent application Ser. No. 12/544,743 filed on Aug. 20, 2009, assigned to the assignee of the present application and incorporated herein by reference in its entirety.

For purpose of illustration only, the following description is made with respect to RAID 6 architecture. Those skilled in the art will readily appreciate that the teachings of the presently disclosed subject matter are not bound by RAID 6 and are applicable in a similar manner to other RAID technology in a variety of implementations and form factors.

Figure 2:
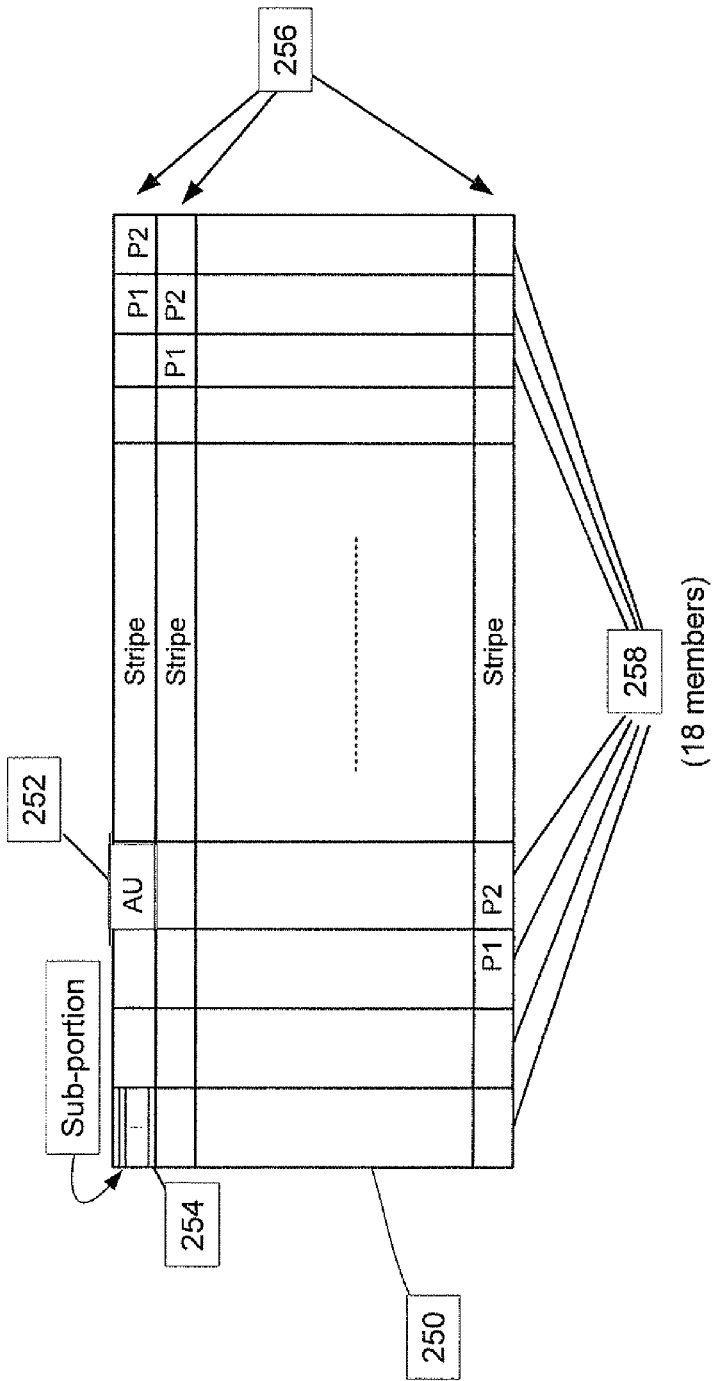
FIG. 2 illustrates a schematic diagram of storage space configured in RAID groups as known in the art.

Referring to FIG. 2, there is illustrated a schematic diagram of storage space configured in RAID groups as known in the art. A RAID group (250) can be built as a concatenation of stripes (256), the stripe being a complete (connected) set of data and parity elements that are dependently related by parity computation relations. In other words, the stripe is the unit within which the RAID write and recovery algorithms are performed in the system. A stripe comprises N+2 data portions (252), the data portions being the intersection of a stripe with a member (258) of the RAID group. A typical size of the data portions is 64 KByte (or 128 blocks). Each data portion is further sub-divided into 16 sub-portions (254) each of 4 Kbyte (or 8 blocks). Data portions and sub-portions (referred to hereinafter also as "allocation units") are used to calculate the two parity data portions associated with each stripe.

Each RG comprises M=N+2 members, MEMi ($0 \leq i \leq N+1$), with N being the number of data portions per RG (e.g. N=16). The storage system is configured to allocate data (e.g. with the help of the allocation module 105) associated with the RAID groups over various physical drives. By way of non-limiting example, a typical RAID group with N=16 and with a typical size of 4 GB for each group member, comprises (4*16=) 64 GB of data. Accordingly, a typical size of the RAID group, including the parity blocks, is of (4*18=) 72 GB.

Figure 3:
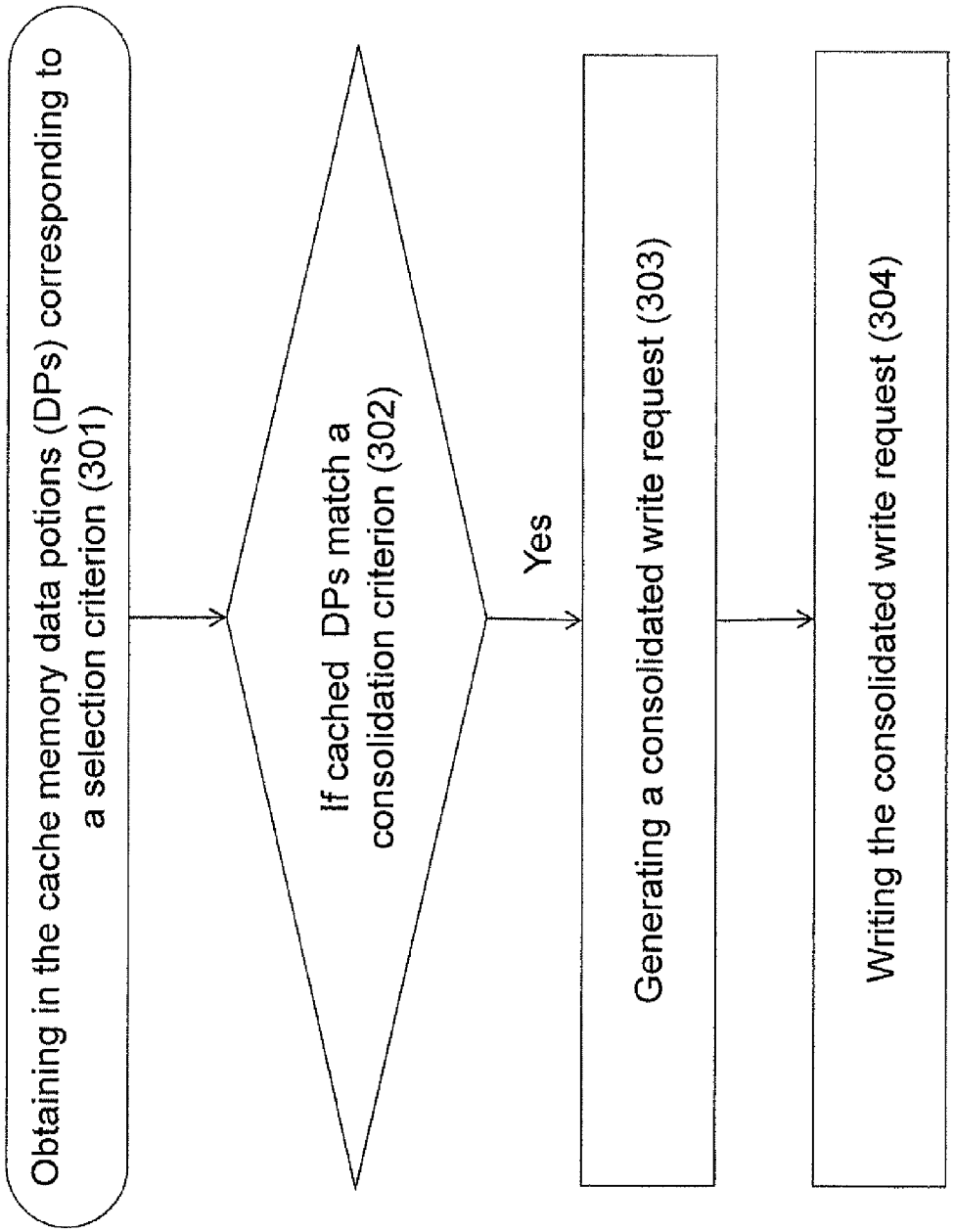
FIG. 3 illustrates a generalized flow-chart of operating the storage system in accordance with certain embodiments of the presently disclosed subject matter.

FIG. 3 illustrates a generalized flow-chart of operating the storage system in accordance with certain embodiments of the presently disclosed subject matter. The cache controller 106 (or other appropriate functional block in the control layer) analyses (302) if data portion(s) obtained (301) in the cache memory for writing and corresponding to a selection criterion (data portions matching a selection criterion are referred to hereinafter as cached data portions) match a pre-defined consolidation criterion.

By way of non-limiting example, data portions matching the selection criterion can be defined as data portions selected in the cache memory and corresponding to a given write request and data portions from previous write request(s) and cached in the memory for writing at the moment of obtaining the given write request. The data portions matching the selection criterion can further include data portions arising in the cache memory from further write request(s) received during a certain period of time after obtaining the given write request. The period of time may be pre-defined (e.g. 1 second) and/or adjusted dynamically according to certain parameters (e.g. overall workload, level of dirty data in the cache, etc.) related to the overall performance conditions in the storage system. Selection criterion can be further related to different characteristics of data portions (e.g. source of data portions and/or type of data in data portions, etc.).

Alternatively or additionally, cached data portions can include data that has arisen in the cache memory in relation to one or more background processes in the storage system (e.g. a defragmentation process and/or a garbage collection process). Likewise, selection criterion can be related to the type of request fetching the data to the memory (e.g. I/O request from a host, I/O request by a certain background process, etc.).

The cache controller consolidates (303) cached data portions matching the consolidation criterion in a consolidated write request and enables writing (304) the consolidated write request to the disk with the help of any appropriate technique known in the art (e.g. by generating a consolidated write request built of respective data portions and writing the request in the out-of-place technique). Generating and destaging the consolidation write request can be provided responsive to a destage event. The destage event can be related to change of status of allocated disk drives (e.g. from low-powered to active status), to a runtime of caching data portions (and/or certain types of data) in the cache memory, to existence of a predefined number of cached data portions matching the consolidation criteria, etc.

Likewise, if at least part of data portions among the cached data portions can constitute a group of N data portions matching the consolidation criterion, where N being the number of data portions per RG, the cache controller enables consolidating respective data portions in the group comprising N data portions and respective parity portions, thereby generating a destage stripe. The destage stripe is a concatenation of N cached data portions and respective parity portion(s), wherein the size of the destage stripe is equal to the size of the stripe of the RAID group. Those versed in the art will readily appreciate that data portions in the destage stripe do not necessarily constitute a group of N contiguous data portions, and can be consolidated in a virtual stripe (e.g. in accordance with teachings of U.S. patent application Ser. No. 13/008,197 filed on Jan. 18, 2011 assigned to the assignee of the present invention and incorporated herein by reference in its entirety). Optionally, if the number M of cached data portions matching the consolidation criterion is less than N (e.g. when runtime of caching these data portions is over), the cache controller can pad missing number N−M of data portions, thus enabling N data portions in the destage stripe.

As has been detailed in U.S. application Ser. No. 13/174,070 filed Jun. 30, 2011 assigned to the assignee of the present invention and incorporated herein by reference in its entirety, the consolidation criterion can be related to expected I/O activities with regard to respective data portions and/or groups thereof.

I/O activities can be related to any access requests addressing respective data portions or to selected types of access requests. By way of non-limiting example, the I/O activities can be considered merely with regard to write requests from one or more hosts addressed to respective data portions. By way of another non-limiting example, the I/O activities can be considered merely with regard to write requests by a certain background process in the storage system. Alternatively or additionally, the consolidation criterion can be related to different characteristics of data portions (e.g. source of data portions and/or type of data in data portions and/or succession of data portions with regard to addresses in the respective logical volume, and/or designated physical location, etc.).

Data portions can be consolidated in the consolidated write request (optionally, in the destage stripe) in accordance with similarity in expected I/O activity. The consolidated write requests comprising data supposed to be frequently used can be handled in the storage system differently from write requests comprising data supposed to be rarely used.

Likewise, data portions characterized by different expected I/O activity can be stored at different disk drives thereby enabling reduced energy consumption. They can be differently addressed by defragmentation and garbage collection background processes, and can be differently treated during destage processes, etc. Furthermore, storing data characterized by similar statistical access patterns physically close to each other can provide, for example, performance benefits because of increasing the chances of retaining in the disk cache data that will be read together, reducing seek time in the drive head, etc.

Generating consolidated write requests in accordance with expected I/O activity with regard to respective data portions may significantly reduce further fragmentation of the stored data.

Straight-forward defragmentation of stored data, whilst reducing the fragmentation, does not always lead to reduction of required storage space. In some cases the defragmentation process can enlarge the physical space required for allocating defragmented data (e.g. as illustrated in non-limiting example in FIGS. 4a-4c).

Similarity of expected I/O activity can be identified based on I/O activity statistics collected from statistical segments obtained by dividing logical volumes into parts with predefined size (typically comprising a considerable amount of data portions). A given statistical segment is configured so that all data portions belonging thereto are characterized by the same statistical access pattern. The statistical access patterns can be characterized by respective activity vectors.

The cache controller (or other appropriate functional block in the control layer) assigns to each statistical segment an activity vector characterizing statistics of I/O requests addressed to data portions within the segments, wherein values characterizing each activity vector are based on access requests collected over one or more cycles with fixed counting length. The cache control module further updates the values characterizing the activity vectors upon each new cycle.

The size of the statistical segments should be small enough to account for the locality of reference, and large enough to provide a reasonable base for statistics. By way of non-limiting example, the statistical segments can be defined of size 1 GB, and the "activity vector" characterizing statistics related to each given segment can be defined of size 128 bits (8*16). All statistical segments can have equal predefined size. Alternatively, the predefined size of a given statistical segment can vary for different segments, and can be predefined depending on data type prevailing in the segment or depending and/or application(s) related to the respective data, etc.

In accordance with certain embodiments of the currently presented subject matter, two or more statistical segments are considered as having similar statistical access patterns if the distance between respective activity vectors matches a predefined similarity criterion.

By way of non-limiting example, similar access patterns can represent statistical regularities in user workloads as, for example:
 a likelihood of re-writing data written in the last few days is higher than for re-writing data written earlier;
 a likelihood of re-writing data written for the first time is lower than for re-writing data that has been re-written;
 data written randomly tends to be re-written randomly, data written sequentially tends to be re-written sequentially;
 a user workload has cycles of operation; data that has been written together within several workload cycles is likely to be written together again in the next workload cycle;
 a likelihood of re-writing data portion with LBA close to LBA of a recently re-written data portion in the same volume is higher than for re-writing data portion with LBA far from this re-written data portion; etc.

By way of further non-limiting example, similar access patterns can represent data from two or more applications storing their data together at given intervals of time (e.g., every hour, by the end of the day, every weekend, and so on); can represent data from a database that stored data in a certain volume and logs in a different volume, but always simultaneously and at given cycles of time, etc.

FIG. 5 illustrates a non-limiting example of an activity vector structure. The cache controller 106 (or other appropriate functional block in the control layer) collects statistics from a given statistical segment with regard to a respective activity vector over cycles with fixed counting length (e.g. 4 hours).

Within a given cycle, I/O activity is counted with fixed granularity intervals, i.e. all access events during the granularity interval (e.g., 1-2 minutes) are counted as a single event. Granularity intervals can be dynamically modified in the storage system, for example making it depend on the average lifetime of an element in the cache. Access events can be related to any access request addressed to respective data portions, or to selected types of access requests (e.g. merely to write requests).

Activity Counter (501) value characterizes the number of accesses to data portions in the statistical segment in a current cycle. A statistical segment is considered as an active segment during a certain cycle if during this period the activity counter exceeds a predefined activity threshold for this period (e.g. 20 accesses). Likewise, a cycle is considered as an active period with regard to a certain statistical segment if during this period the activity counter exceeds a predefined activity threshold for this certain statistical segment. Those versed in the art will readily appreciate that the activity thresholds can be configured as equal for all segments and/or cycles. Alternatively, the activity thresholds can differ for different segments (e.g. in accordance with data type and/or data source and/or data destination, etc. comprised in respective segments) and/or for different cycles (e.g. depending on a system workload). The activity thresholds can be predefined and/or adjusted dynamically.

Activity Timestamp (502) value characterizes the time of the first access to any data portion in the segment within the current cycle or within the last previous active cycle if there are no accesses to the segment in the current period. Activity Timestamp is provided for granularity intervals, so that it can be stored in a 16-bit field.

Activity points-in-time values t1 (503), t2 (504), t3 (505) indicate time of first accesses within the last three active periods of the statistical segment. The number of such points-in-time is variable in accordance with the available number of fields in the activity vector and other implementation considerations.

Waste Level (506), Defragmentation Level (507) and Defragmentation Frequency (508) are optional parameters to be used for defragmentation and/or garbage collection processes depending on access patterns.

Waste Level (506) characterizes a number of additional physical data portions required for allocation the statistical segment upon defragmentation of all corresponding data portions.

By way of non-limiting example (referred to hereinafter as Example A), the defragmentation process can identify M data portions written by a host, read them into the cache memory and defragment the data portions by consolidating into respective destage stripe (e.g. selection criteria—data portions aroused in the cache memory by defragmentation process, consolidation criteria—data portions written by a certain host). If M<N, the destage stripe will include N−M padded data portions. Thus, the defragmented destage stripe requires storage space for N data portions versus storage space for M<N data portions required before defragmentation.

Figure 4A:
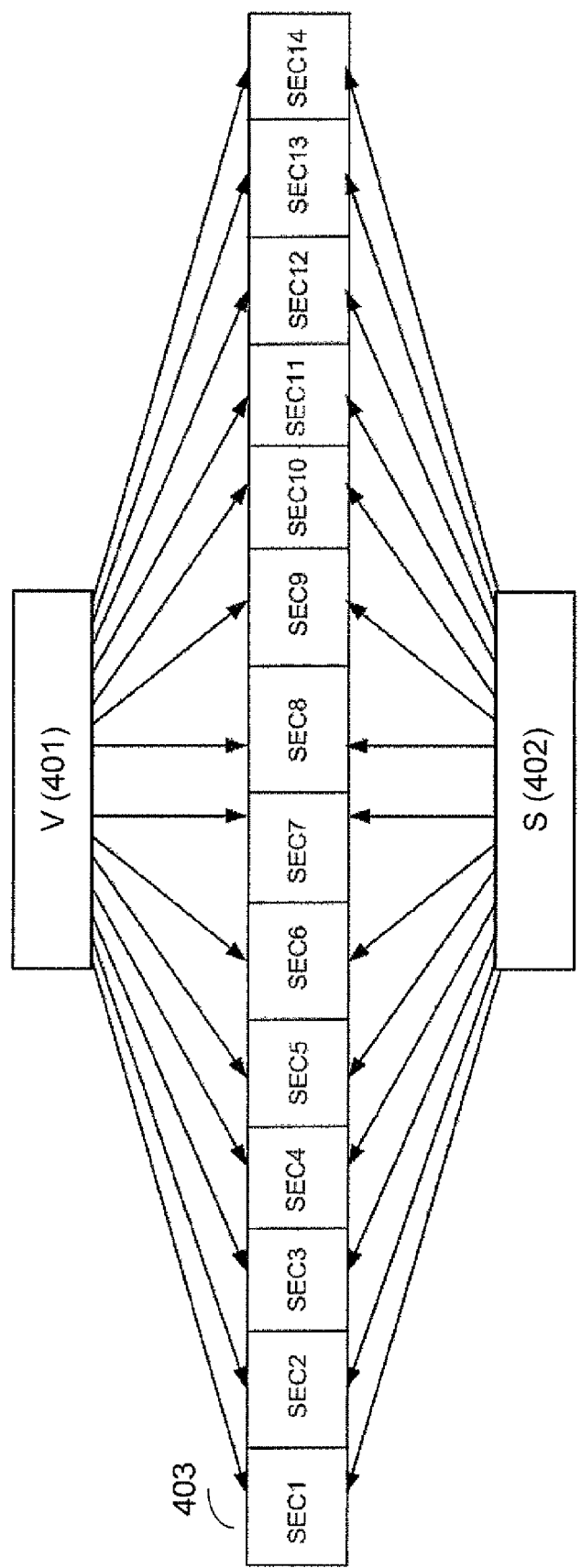
FIGS. 4a-4c illustrate schematic diagrams of exemplified volumes and respective snapshots before and after the defragmentation process.
Figure 4B:
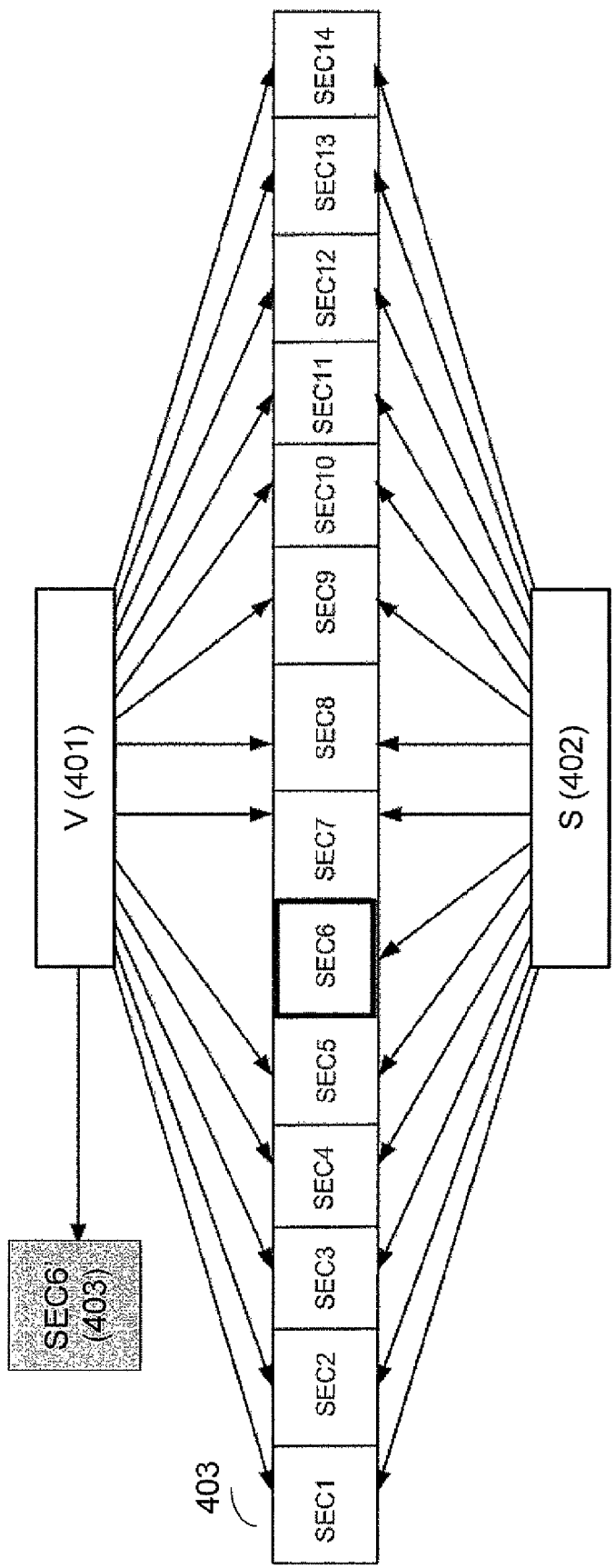
Figure 4C:
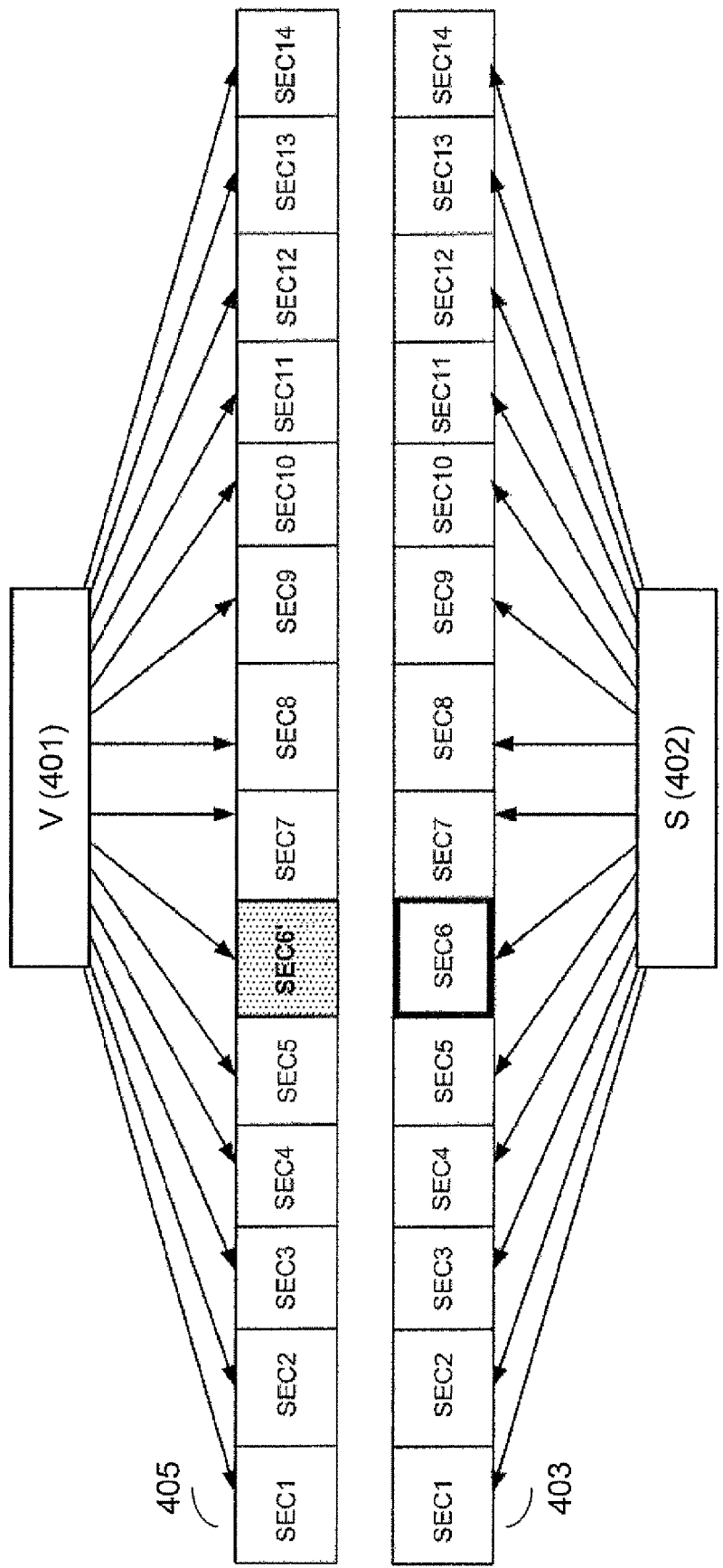

Another non-limiting example of increasing required physical space resulting from a defragmentation process (referred to hereinafter as Example B) is illustrated in FIGS. 4a-4c. FIG. 4a schematically illustrates a stripe (403) of fourteen data portions that are sequential in the logical and physical address spaces and belong to a volume V (401) on which a snapshot S (402) has been performed. At this point all data portions are common between the volume and the snapshot, and storing data related to the volumes and data related to the snapshot requires allocation of fourteen physical data portions.

FIG. 4b schematically illustrates the volume 401 and the snapshot 402 when a data portion SEC6 in the stripe is modified into a modified data portion SEC6' 404. SEC6 and SEC6' are stored at different locations. The volume 401 points to data portion SEC6', while the snapshot 402 continues to point to SEC6. The rest of data portions are still commonly pointed by the volume 401 and the snapshot 402. Thus, storage of fourteen logical data portions of the volume 401 and fourteen logical data portions of the snapshot 402 requires fifteen physical data portions.

FIG. 4c schematically illustrates the volume 401 and the snapshot 402 upon performing the defragmentation process. Since, upon modification SEC6 to SEC6', the respective stripe becomes fragmented, the defragmentation process reads into the cache memory thirteen original data portions from their original location and SEC6' from the new location, and generates new defragmented stripe 405 for the volume 401. At the same time, however, fourteen original data portions need to remain at their original physical location corresponding to the snapshot 402. Thus, after the defragmentation process, storage of fourteen logical data portions of the volume 401 and fourteen logical data portions of the snapshot 402 requires twenty-eight physical data portions instead of fifteen physical data portions.

In the case of Example A above, the illustrated defragmentation has contributed N–M value to the waste level characterizing statistical segment comprising the stripe. In the case of Example B above, defragmentation requires thirteen additional physical data portions (13=(14+14)–(14+1)) for storage; thus, assuming that the stripes 403 and 405 are comprised in the same statistical segment, contribution of the illustrated defragmentation to the waste level is equal to thirteen.

Defragmentation Level (507) characterizes a number of stripes comprised in the given statistical segment which need to be defragmented.

Defragmentation Frequency (508) can indicate, for example, the last time when the stripes corresponding to the segment were defragmented (measured in days).

The cache controller (or other appropriate functional block in the control layer) updates the values of Activity Counter (501) and Activity Timestamp (502) in an activity vector corresponding to a segment SEG as follows: responsive to accessing a data portion $DP_s$ in the segment SEG at a granularity interval T, if 0<(T−Activity Timestamp)≤counting length of cycle (i.e. the segment SEG has already been addressed in the present cycle), the cache controller increases the value of Activity Counter by one, while keeping the value of Activity Timestamp unchanged;

if (T−Activity Timestamp)>counting length of cycle, the cache controller resets the Activity Counter and starts counting for a new cycle, while T is set as a new value for Activity Timestamp.

In certain embodiments, counting length of a cycle can characterize the maximal time between the first and the last access requests related to a given statistical segment. Accordingly, counting length of a new cycle can start with the first access request after the last access request in a previous cycle. Thus, cycles for different segments can be started and ended independently, whilst each having the predefined duration after the first access event in the cycle.

Alternatively or additionally, for at least part of the statistical segments, the cycles can be pre-scheduled and can start regardless the access requests.

The counting length of cycles can be equal for all statistical segments. Alternatively, it can vary for different statistical segments depending on size of the statistical segment (in embodiments with different predefined sizes), data type prevailing in the segment or depending and/or application(s) related to the respective data, etc.

The cache controller checks, before resetting the Activity Counter, if the current value of the Activity Counter is more than a predefined Activity Threshold. Accordingly, if the segment has been active in the period preceding the reset, activity points-in-time values t1 (503), t2 (504) and t3 (505) are updated as follows: the value of t2 becomes the value of t3; the value of t1 becomes the value of t2; the value of t1 becomes equal to T (the updated Activity Timestamp). If the current value of Activity Counter before reset is less than the predefined Activity Threshold, values t1 (503), t2 (504), t3 (505) are kept without changes.

Likewise, the cache controller (or other appropriate functional block in the control layer) updates Waste Level (506), Defragmentation Level (507) and Defragmentation Frequency (508) every time that a data portion in the statistical segment is accessed.

Thus, at any given point in time, the activity vector corresponding to a given segment characterizes:
the current level of I/O activity associated with the given segment (the value of Activity Counter);
the time (granularity interval) of the first I/O addressed at the segment in the current cycle (the value of Activity Timestamp) and in previous cycles (values of t1, t2, t3) when the segment was active;
defragmentation characteristics of the given statistical segment.

Optionally, the activity vector can further comprise additional statistics collected for special kinds of activity, e.g., reads, writes, sequential, random, etc.

In accordance with certain aspects of subject matter of the present application, data portions with similar statistical access patterns can be identified with the help of a "distance" function calculation based on the activity vector (e.g. values of parameters (t1, t2, t3) or (parameters Activity Timestamp, t1, t2, t3)). The distance function allows sorting any given collection of activity vectors according to proximity with each other.

The exact expression for calculating the distance function can vary from storage system to storage system and, through time, for the same storage system, depending on typical workloads in the system. By way of non-limiting example, the distance function can give greater weight to the more recent periods, characterized by values of Activity Timestamp and by t1, and less weight to the periods characterized by values t2 and t3. By way of non-limiting example, the distance between two given activity vectors V,V' can be defined as $d(V,V')=|t1-t'1|+(t2-t'2)^2+(t3-t'3)^2$.

Two segments SEG, SEG' with activity vectors V,V' can be defined as "having a similar statistical access pattern" if $d(V, V')<B$, where B is a similarity criterion. The similarity criterion can be defined in advance and/or dynamically modified according to global activity parameters in the system.

Those skilled in the art will readily appreciate that the distance between activity vectors can be defined by various appropriate ways, some of them known in the art. By way of non-limiting example, the distance can be defined with the help of techniques developed in the field of cluster analyses, some of them disclosed in the article "Distance-based cluster analysis and measurement scales", G. Majone, Quality and Quantity, Vol. 4 (1970), No. 1, pages 153-164.

In accordance with certain aspects of subject matter disclosed in the present application, there is provided a technique of providing defragmentation and/or garbage collection operations as a background process operating in accordance with identified similar access patterns of respective data portions.

Figure 6:
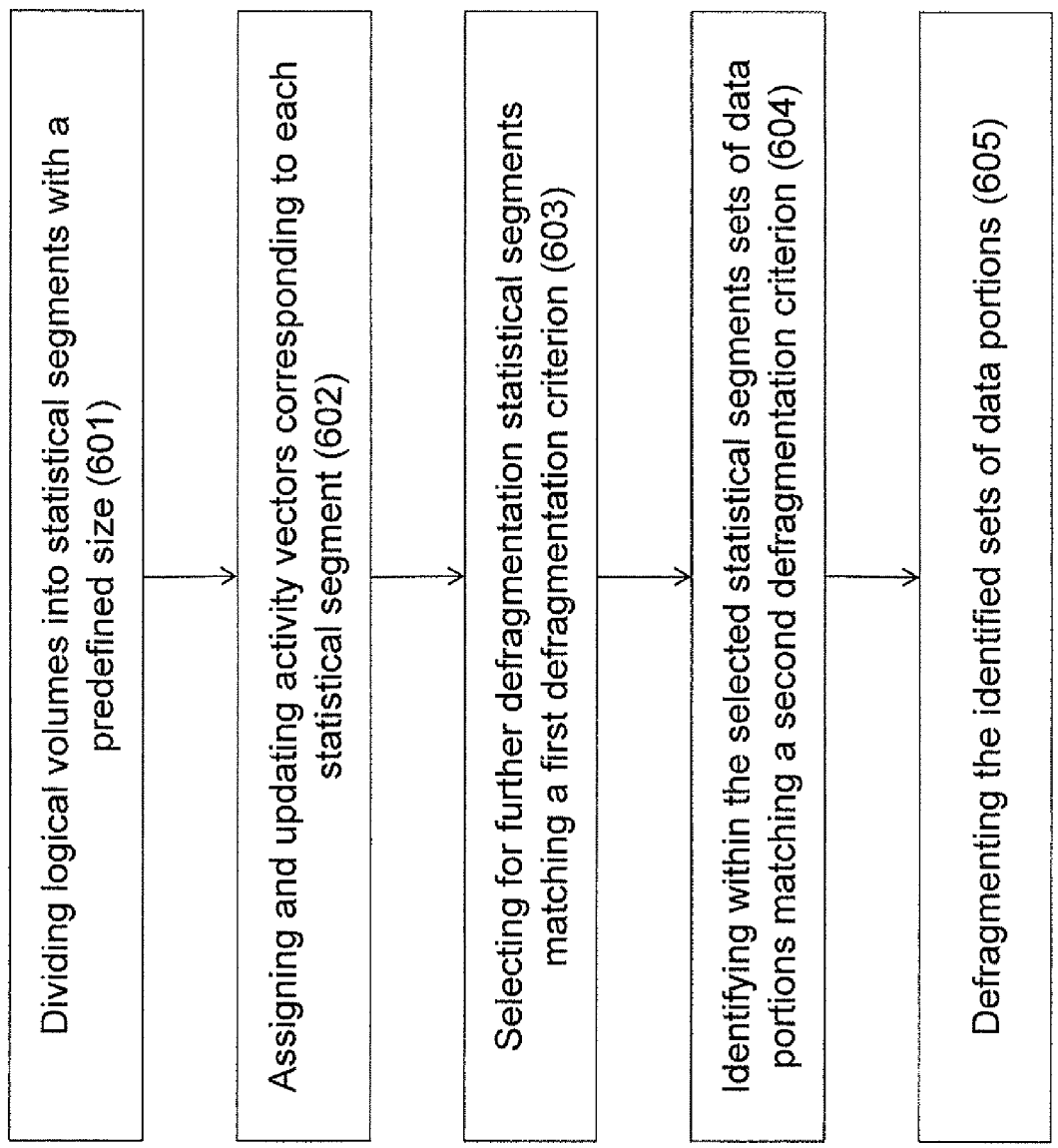
FIG. 6 illustrates a generalized flow-chart of defragmenting the stored data in accordance with certain embodiments of the currently presented subject matter.

FIG. 6 illustrates a generalized flow-chart of defragmenting the stored data in accordance with certain embodiments of the currently presented subject matter.

After logical volumes are divided (601) into statistical segments and each statistical segment has an assigned (602) activity vector updated upon each new cycle and characterizing statistics of I/O requests addressed to data portions within the segment, the defragmentation module 108 (or other appropriate functional module) identifies (603) one or more statistical segments with activity vectors matching a first defragmentation criterion and selects such statistical segments for further defragmentation.

By way of non-limiting example, the first defragmentation criterion, i.e. the criterion for selecting statistical segments for further defragmentation, can be configured as a lower threshold value $T_{DL}$ for current value of Defragmentation Level in the respective activity vector and/or an upper threshold value $T_{WL}$ for current value of Waste Level and/or as an upper threshold value $T_w$ for current value of a function indicating activity of the segment (e.g. W (Activity Counter, Activity Timestamp, t1)), etc.

The defragmentation module further identifies (604) sets of data portions within the selected statistical segments, such sets matching a second defragmentation criterion. By way of non-limiting example, the second defragmentation criterion can characterize a lower threshold of empty (padded) data portions in a given set, and/or the lower threshold of out-dated data portions in the given set and/or upper threshold of additional data portions to be required for storing the given set after defragmentation, etc. By way of non-limiting example, a set of data portions for defragmentation can be constituted by all data portions within a given stripe, all data portions within two or more logically related stripes (e.g. stripes corresponding to a volume and its snapshots, stripes related to a certain client, etc.), or otherwise combined data portions within the selected statistical segment.

The first and the second defragmentation criteria can be predetermined and/or further dynamically adjusted according to operating parameters of the storage system (e.g. a current overall workload in the system, a balance between the overall defragmentation level in the system and memory space required for handling defragmentation, etc.).

In certain embodiments of the currently presented subject matter, the defragmentation module 108 can be configured to handle a constantly updated list of statistical segments and sets of data portions therein matching the defragmentation criteria. The statistical segments and/or the sets of data portions in the list can be prioritized for further defragmentation. Alternatively, the defragmentation module can be configured to identify the segments/data portions for defragmentation in accordance with a predefined schedule and/or a predefined event (e.g. initiation of the defragmentation process).

The identified sets of data portions matching the second defragmentation criterion are further defragmented (605), i.e. the defragmentation module causes reading the data portions to the cache memory and writing-back to the physical storage in a manner enabling sequential physical storing thereof.

The defragmentation module can be further configured to initiate (and/or to finish) the background selecting and/or defragmentation of selected sets of data portions process in accordance with a predefined schedule and/or a predefined event and/or a predefined characteristics of the storage system (e.g. load of the storage system or parts thereof, current level of defragmentation in the storage system (or certain disks), etc.).

Operations 602-605 can be provided as a background process running in the storage system.

In certain embodiments of the presently presented subject matter, the defragmented data portions can be consolidated in the cache memory into a consolidated write request as was detailed with reference to FIG. 3. Such a consolidated write request can include merely data portions from a given identified set of data portions or may further include other data portions cached in the cache memory and matching a consolidation criterion.

Figure 7:
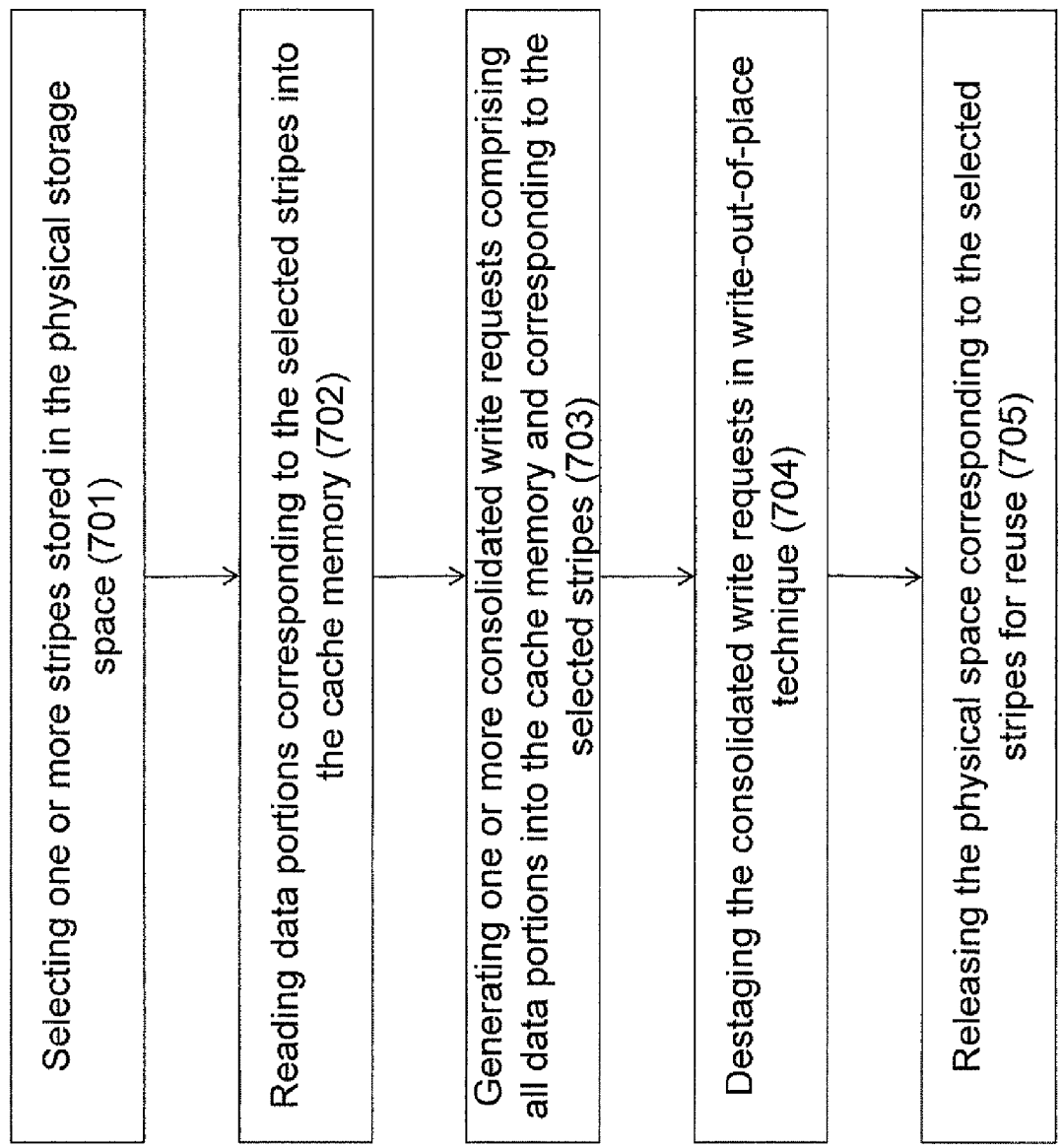
FIG. 7 illustrates a generalized flow-chart of garbage collecting within the stored data in accordance with certain embodiments of the currently presented subject matter.

FIG. 7 illustrates a generalized flow-chart of garbage collecting within the stored data in accordance with certain embodiments of the currently presented subject matter.

For purpose of illustration only, the description of garbage collection is provided with respect to stripes. Those skilled in the art will readily appreciate that the teachings of the presently disclosed subject matter are applicable in a similar manner to other appropriate sets of data portions.

The garbage collection process selects certain stripes with gaps (e.g. padded or out-dated data) and re-arranges them into as few stripes as possible.

The garbage collection process comprises:
selecting one or more stripes stored in the physical storage space (701);
reading data portions corresponding to the selected stripes into the cache memory (702);
generating one or more consolidated write requests comprising all data portions into the cache memory which correspond to the selected stripes (703);
destaging the consolidated write requests in write-out-of-place technique (704);
upon destaging the consolidated write request, releasing the physical space corresponding to the selected stripes for reuse (705).

The garbage collecting process can run as a background process and can be scheduled and/or triggered by a predefined event. By way of non-limiting example, the process may be invoked when the number of free stripes falls below a certain pre-established threshold (e.g., 2% of the stripes, 1000 free stripes, or otherwise defined threshold).

A stripe for further re-arrangement can be selected in accordance with a number of gaps within the stripe. Alternatively or additionally, the stripes for further re-arrangement can be selected in accordance with activity level (preferred to select the stripes characterized by low activity). Likewise detailed with reference to FIG. 6, the defragmentation module can be configured to select statistical segments corresponding to a first garbage collection criterion (e.g. the activity level required for garbage collection) and to identify within the selected segments the stripes with number of gaps above a respective threshold (and/or matching another second garbage collection criterion).

In certain embodiments of the currently presented subject matter, the defragmentation module 108 can be configured to handle a constantly updated list of statistical segments and sets of data portion therein matching the garbage collection criteria. The statistical segments and/or the sets of data portions in the list can be prioritized for further garbage collection.

Figure 8:
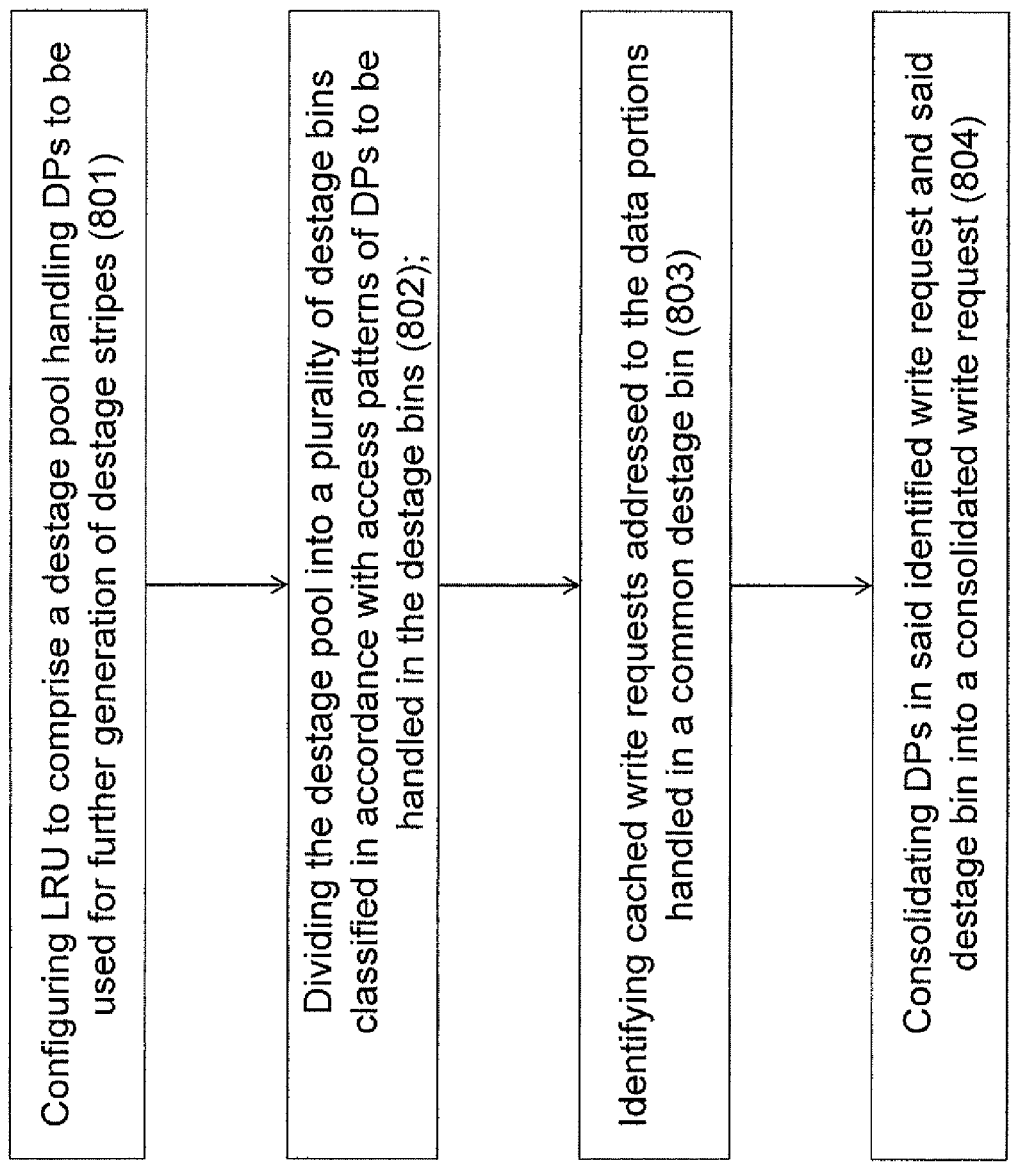
FIG. 8 illustrates a generalized flow-chart a generalized flow chart of handling destage operations in accordance with certain embodiments of the currently presented subject matter.

Referring to FIG. 8, there is provided a generalized flow chart of handling destage operations in accordance with certain embodiments of the currently presented subject matter.

As was detailed with reference to FIG. 1, the cache control module 107 is configured to manage the process of handling dirty data in the cache memory 106. The management can be provided with the help of usage-based replacing techniques as, by way of non-limiting example, known in the art LRU (Least Recently Used) technique, LFU (Least Frequently Used) technique, MFU (Most Frequently Used) technique, weighted-LRU techniques, pseudo-LRU techniques, etc. Usage-based replacing techniques enable destaging the data portions from the cache memory in accordance with certain usage-related criteria. These techniques take advantage of temporal locality, which may favor destaging data portions least likely to be written to while in the write cache, and thus most likely to eventually be destaged.

The usage-based replacement techniques enable optimization of cache write operations based on temporal locality. Accordingly, the number of destage operations is minimized by favorable destaging data that is least likely to be rewritten soon.

For purpose of illustration only, the following description is provided for LRU technique with separate handling of dirty data. Those skilled in the art will readily appreciate that the teachings of the present invention are applicable in a similar manner to any other usage-based replacing techniques. In the LRU technique the cache control module can maintain a linked list having one entry for each data portion stored in the cache, which can comprise write data buffered in a cache before writing to the storage device or read data. If data in the cache is accessed, then the entry in the LRU list for the accessed data is moved to a top of the list. If the requested data is not in the cache, then the data in the cache whose entry is at the bottom of LRU list can be evicted, and an entry for the new data staged into cache is added to the top of the LRU list. With this LRU cache technique, data that is more frequently accessed is likely to remain in the cache, while data less frequently accessed will more likely be removed from the LRU end of the list to make room in the cache for newly accessed data.

Wise Ordering for Writes (WOW) algorithm disclosed in US Patent Application No. 2007/220201 incorporated herewith by reference, further enables to exploit spatial locality, which means that data is written to storage locations that are closest to each other, thereby minimizing the distance the storage device write mechanism and storage media needs to be moved to reach the next storage location to write. The WOW algorithm employs a circular linked list or clock where the circular linked list has one entry for each write request buffered in the cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

In accordance with certain embodiments of the currently presented subject matter, there is provided a technique of handling destage operations in accordance with identified similar access patterns of respective data portions. Such a technique can be implemented alternatively or additionally to handling destage operations in accordance with temporal and/or spatial localities.

A replacement sequence (e.g. LRU) used in the cache memory for managing dirty data is configured (801) to comprise a destage pool, this destage pool configured to handle data portions to be used for further generation of destage stripes. The pool can be located at the bottom of the replacement sequence.

The destage pool is further divided (802) in two or more destage bins classified in accordance with access patterns characterizing the data portions to be handled in the destage bins. Data portions corresponding to statistical segments with similar access patterns are handled within a common destage bin.

The size of the destage pool (e.g. 10% of entire LRU) is selected with the intention that at any point in time the number of data portions in the bins should be large enough so as to allow identifying sequences of required length. On the other hand, this size shall be small enough to allow a quick insertion of data into the bins. A reasonable number, according to the parameters of typical storage system is 2-3 thousand data portions in the bins, which can cover up to 100 streams of sequential data running together.

By way of non-limiting example, the destage pool can be divided into four destage bins defined in accordance with access patterns as following:
 Currently Active Data Portions Bin;
 New Writes Bin configured for data portions without assigned physical address space;
 Recently Active Data Portions Bin; and
 Recently Inactive Data Portions Bin.

The cache controller enables identifying (803), among cached write requests, one or more write requests addressed to the data portions handled in a common destage bin, and consolidating (804) respective data portions in said identified write request and in said common destage bin into a consolidated write request detailed with reference to FIG. 3.

Generating the consolidated write request can be further modified. For example, the data portions within a given bin can be ranked for consolidation according to similarity of their access patterns, according to physical storage address (e.g. for creating sequential data portions within the bins), frequency of addressing certain data portions, etc. Upon destaging the consolidated write request, data portions handled in the dirty LRU can be moved to the respective bin.

Responsive to a write request, one or more respective data portions handled in the destage pool can be swapped-out from the destage pool before performing the write request.

Writing the consolidated write requests can be provided in accordance with pre-defined priorities as, by way of non-limiting examples, priority for consolidated write requests with sequential data portions and priority for consolidated write requests with optimal length. Data portions in the New Writes bin or in bin with data portions inactive over some predefined period (say, one week), can be evicted from the cache with the highest priority.

Different areas in the physical storage space can be assigned to different bins. In this way, data portions characterized by similar access patterns will be stored closely on the drives, thus enhancing performance.

Destage bins can be classified in accordance with activity vectors characterizing data segments comprising data portions to be handled in the bins. Namely, Currently Active Data Portions Bin can comprise data portions from segments with value of respective Active Counter>3.

Recently Active Data Portions Bin can comprise data portions from segments with value of respective Active Counter<4, but active over the last activity cycle as indicated by the Activity Timestamp.

Recently Inactive Data Portions Bin can comprise data portions from segments with value of respective Active Counter<4, and inactive over the last activity cycle as indicated by the Activity Timestamp.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a storage system comprising a control layer operable to interface with one or more clients and to present to said clients a plurality of logical volumes, said control layer comprising a cache memory and further operatively coupled to a physical storage space comprising a plurality of disk drives, the method comprising:
   dividing one or more logical volumes into a plurality of statistical segments with predefined size;
   assigning to each given statistical segment a corresponding activity level characterizing statistics of I/O activity with regard to data portions within the given statistical segment, said statistics collected over a plurality of cycles of fixed counting length; and
   managing one or more data storage processes in the storage system using said activity level.

2. The method of claim 1 wherein said activity level of a given statistical segment is characterized by an activity vector assigned to said given statistical segment, said activity vector characterized by at least one value obtained during a current cycle and by at least one value related to I/O statistics collected during at least one of the previous cycles.

3. The method of claim 1 wherein at least one of said one or more data storage processes is selected from a group comprising a background defragmentation process; a background garbage collection process; and a destage management process.

4. The method of claim 3 further comprising:
   selecting one or more statistical segments with activity levels fitting a first selection criterion related a given data storage process; and
   executing said given data storage process for one or more sets of data portions corresponding to the selected statistical segments, wherein said one or more sets of data portions fit a second selection criterion related a given data storage process.

5. The method of claim 1 further comprising:
   selecting one or more statistical segments with activity levels fitting a first defragmentation criterion; and
   providing defragmentation of one or more sets of data portions corresponding to the selected statistical segments, wherein said one or more sets of data portions fit a second defragmentation criterion.

6. The method of claim 5 further comprising:
   reading to the cache memory said one or more sets of data portions to yield data portions to be defragmented;
   consolidating data portions cached in the cache memory and corresponding to the same statistical segment into one or more consolidated write requests, wherein said data portions to be defragmented constitute at least part of data portions in the consolidated write requests; and
   enabling writing said one or more consolidated write requests to one or more disk drives.

7. The method of claim 5 wherein data portions constituting a given set of data portions are selected from a group comprising all data portions within a given stripe in a RAID group, all data portions within two or more consecutive stripes in a RAID group, and all data portions within two or more logically-related stripes in one or more RAID groups.

8. The method of claim 6 wherein a given consolidated write request corresponds to a stripe in a RAID group.

9. The method of claim 6 wherein writing the consolidated write request is provided in a write-out-of-place technique.

10. The method of claim 5 wherein said activity level of a given statistical segment is characterized by an activity vector assigned to said given statistical segment, said activity vector characterized by at least one value obtained during a current cycle and by at least one value related to I/O statistics collected during at least one of the previous cycles, and wherein at least one of the values characterizing the activity vector is related to additional physical data space required resulting from the defragmentation of data portions within the statistical segment.

11. The method of claim 5 further comprising handling a constantly updated list of statistical segments matching said first defragmentation criterion.

12. The method of claim 1 further comprising:
   selecting one or more statistical segments with activity levels fitting a first garbage collection criterion; and
   providing re-arrangement of one or more sets of data portions corresponding to the selected statistical segments, wherein said re-arrangement enables releasing at least physical storage space corresponding to padded or outdated data portions within said one or more sets of data portions.

13. The method of claim 12 further comprising:
reading to the cache memory said one or more sets of data portions to yield data portions to be re-arranged;
consolidating data portions cached in the cache memory and corresponding to the selected statistical segments into one or more consolidated write requests, wherein said data portions to be re-arranged constitute at least part of data portions in the consolidated write requests;
enabling writing said one or more consolidated write requests to one or more disk drives in write-out-of-place technique; and
upon writing the consolidated write request, releasing the physical space corresponding to said one or more sets of data portions.

14. The method of claim 12 wherein data portions constituting a given set of data portions are selected from a group comprising all data portions within a given stripe in a RAID group, all data portions within two or more consecutive stripes in a RAID group, and all data portions within two or more logically-related stripes in one or more RAID groups, and wherein a given consolidated write request corresponds to a stripe in a RAID group.

15. The method of claim 1 wherein the cache memory is operable to handle dirty data by managing a replacement sequence, the method further comprising:
configuring the replacement sequence to comprise a destage pool operable to handle data portions to be used for further generation of one or more consolidated write requests;
dividing the destage pool into a plurality of destage bins;
handling data portions corresponding to segments with similar access patterns within a common destage bin, wherein two or more segments have similar access patterns if distance between respective activity levels matches a predefined criteria;
consolidating data portions cached in the cache memory and corresponding to the same destage bin into one or more consolidated write requests; and
enabling writing said one or more consolidated write requests to one or more disk drives.

16. The method of claim 15 wherein said pool is located at the bottom of the replacement sequence.

17. A storage system comprising a physical storage space comprising a plurality of disk drives and operatively coupled to a control layer operable to interface with one or more clients and to present to said clients a plurality of logical volumes, wherein said control layer comprises a cache memory and is further operable:
to divide one or more logical volumes into a plurality of statistical segments with predefined size;
to assign to each given statistical segment a corresponding activity level characterizing statistics of I/O activity with regard to data portions within the given statistical segment, said statistics collected over a plurality of cycles of fixed counting length; and
to manage one or more data storage processes in the storage system using said activity levels.

18. The storage system of claim 17 wherein said activity level of a given statistical segment is characterized by an activity vector assigned to said given statistical segment, said activity vector characterized by at least one value obtained during a current cycle and by at least one value related to I/O statistics collected during at least one of the previous cycles.

19. The storage system of claim 17 wherein at least one of said one or more data storage processes is selected from a group comprising a background defragmentation process; a background garbage collection process; and a destage management process.

20. The storage system of claim 19 wherein the storage control layer is further operable:
to select one or more statistical segments with activity levels fitting a first selection criterion related a given data storage process; and
to execute said given data storage process for one or more sets of data portions corresponding to the selected statistical segments, wherein said one or more sets of data portions fit a second selection criterion related a given data storage process.

21. The storage system of claim 18 wherein the storage control layer is further operable to select one or more statistical segments with activity levels fitting a first defragmentation criterion; and wherein the storage control layer further comprises a defragmentation module operatively coupled to the cache memory and operable to enable defragmentation of one or more sets of data portions corresponding to the selected statistical segments, wherein said one or more sets of data portions fit a second defragmentation criterion.

22. The storage system of claim 21 wherein the storage control layer is further operable to:
enable reading to the cache memory said one or more sets of data portions to yield data portions to be defragmented;
to consolidate data portions cached in the cache memory and corresponding to the same statistical segment into one or more consolidated write requests, wherein said data portions to be defragmented constitute at least part of data portions in the consolidated write requests; and
to enable writing said one or more consolidated write requests to one or more disk drives.

23. The storage system of claim 18 wherein said activity level of a given statistical segment is characterized by an activity vector assigned to said given statistical segment, said activity vector characterized by at least one value obtained during a current cycle and by at least one value related to I/O statistics collected during at least one of the previous cycles, and wherein at least one of the values characterizing the activity vector is related to additional physical data space required resulting from the defragmentation of data portions within the statistical segment.

24. The storage system of claim 21 wherein the storage control layer further comprises a defragmentation module, said defragmentation module is operable to handle a constantly updated list of statistical segments matching said first defragmentation criterion.

25. The storage system of claim 18 wherein the storage control layer is further operable to select one or more statistical segments with activity levels fitting a first garbage collection criterion; and to provide re-arrangement of one or more sets of data portions corresponding to the selected statistical segments, wherein said re-arrangement enables releasing at least physical storage space corresponding to padded or outdated data portions within said one or more sets of data portions.

26. The storage system of claim 25 wherein the storage control layer is further operable to read to the cache memory said one or more sets of data portions to yield data portions to be re-arranged;
to consolidate data portions cached in the cache memory and corresponding to the selected statistical segments into one or more consolidated write requests, wherein said data portions to be re-arranged constitute at least part of data portions in the consolidated write requests;

to enable writing said one or more consolidated write requests to one or more disk drives in write-out-of-place technique; and upon writing the consolidated write request, to release the physical space corresponding to said one or more sets of data portions.

27. A computer program product comprising a non-transitory computer readable medium storing computer readable program code for a computer operating a storage system comprising a control layer is operable to interface with one or more clients and to present to said clients a plurality of logical volumes, said control layer comprising a cache memory and further operatively coupled to a physical storage space comprising a plurality of disk drives, the computer program product comprising:

computer readable program code for causing the computer to divide one or more logical volumes into a plurality of statistical segments with predefined size;

computer readable program code for causing the computer to assign to each given statistical segment a corresponding activity level characterizing statistics of I/O activity with regard to data portions within the given statistical segment, said statistics collected over a plurality of cycles of fixed counting length; and computer readable program code for causing the computer to manage one or more data storage processes in the storage system using said activity levels.

* * * * *